(12) United States Patent
Narasimha

(10) Patent No.: US 7,778,653 B2
(45) Date of Patent: Aug. 17, 2010

(54) METHOD AND APPARATUS FOR TARGETED PAGING IN A MULTI-CELL WIRELESS COMMUNICATION SYSTEM

(75) Inventor: Murali Narasimha, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 809 days.

(21) Appl. No.: 11/674,998

(22) Filed: Feb. 14, 2007

(65) Prior Publication Data
US 2008/0194252 A1 Aug. 14, 2008

(51) Int. Cl.
H04W 68/00 (2009.01)
(52) U.S. Cl. .................. 455/458; 455/456.1; 455/456.2; 455/432.1
(58) Field of Classification Search .................. 455/422, 455/433, 458, 456.1, 456.2, 432.1
See application file for complete search history.

(56) References Cited

U.S. PATENT DOCUMENTS

| | | | | |
|---|---|---|---|---|
| 5,943,621 | A | * 8/1999 | Ho et al. | ................... 455/456.3 |
| 6,181,933 | B1 | 1/2001 | Jeong | |
| 2001/0034232 | A1 | 10/2001 | Kuwahara | |
| 2008/0032713 | A1* | 2/2008 | Yang | ........................... 455/458 |

FOREIGN PATENT DOCUMENTS

DE 4316091 A1 11/1994

WO 9905879 A 2/1999

OTHER PUBLICATIONS

C20-20060911-012 "Analysis of Quick Paging Channel Capacity for LBC", Motorola, 3GPP2 TSG-C contribution, Sep. 11, 2006.

(Continued)

*Primary Examiner*—Temica M Beamer
(74) *Attorney, Agent, or Firm*—Ingrassia, Fisher & Lorenz, P.C.

(57) ABSTRACT

A method and communication system is provided for optimizing paging of a mobile communication device in cells of a multi-cell communication system. The communication system includes the cells, a network controller, and the mobile communication device. Each of the cells has a base station located therein for transmitting and receiving radio frequency (RF) signals. The network controller is coupled to each of the base stations and provides information thereto for transmission as RF signals within an associated cell, the network controller also receiving information from the base stations that is received from RF signals transmitted in the associated cell. The mobile communication device travels within the cells during one or more mobile communication device runs and detects RF signals transmitted from the base stations. Thereafter, the mobile communication device provides run information to the network controller identifying acquired cells acquired during the one or more mobile communication device runs and neighbor cells adjacent to the acquired cells and detected during the one or more mobile communication device runs at a signal strength greater than a predetermined signal strength. The network controller receives the run information and defines a user specific paging zone for the mobile communication device, the user specific paging zone including a portion of the ells selected in response to the run information.

35 Claims, 11 Drawing Sheets

OTHER PUBLICATIONS

C20-20060731-032 The Upper Layer Proposal for DO Rev-C- Part I, Lucent Technologies 3GPP2 TSG-C contribution, Jul. 31, 2006.
Wang K. et al, "Intelligent Location Tracking Strategy in PCS", IEEE Proceedings; Communications, Institution of Electrical Engineers, Feb. 11, 2000, pp. 63-68, vol. 147, No. 1.

Hssiao-Kuang Wu et al. "Personal Paging Area Design Based on Mobile's Moving Behaviors", Proceedings IEEE Infocom 2001 . . . The Conference on Computer Communications 20th Annual Joint Conference of the IEE Computer and Communications Societies, Apr. 22-26, 2001, pp. 21-30, vol. 1, Anchorage, AK.

* cited by examiner

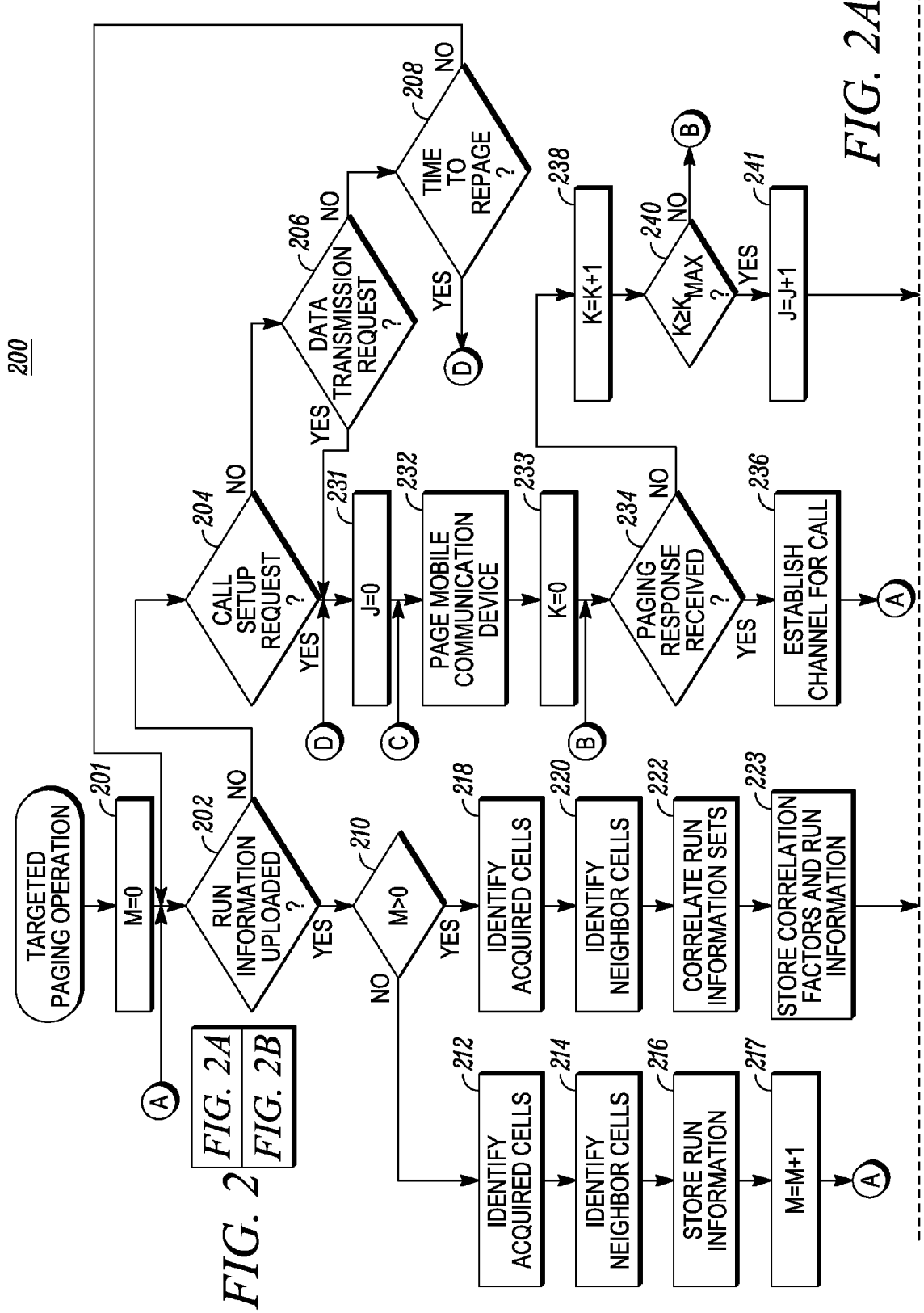

| RUN START TIME 302 | RUN END TIME 304 | |
|---|---|---|
| ACQUIRED CELL IDENTIFICATION 306 | AMOUNT OF TIME SPENT IN ACQUIRED CELL 308 | NEIGHBOR CELLS IDENTIFICATION (ADJACENT CELLS HAVING SIGNALS DETECTED ABOVE A PREDETERMINED SIGNAL THRESHOLD) 310 |
| A | 300 MINS | P,Q,R |
| B | 5 MINS | S,T,A |
| C | 3 MINS | U,V |
| D | 6 MINS | W |
| ● ● ● | | |
| X | 400 MINS | M,N,O |
| Y | 100 MINS | N,O,P |
| ● ● ● | | |
| B | 2 MINS | S,T,A |
| A | 600 MINS | P,Q |

|    | R1   | R2   | R3   | R4  | R5  | R6   |
|----|------|------|------|-----|-----|------|
| R1 | 1    | 0.9  | 0.9  | 0.2 | 0.9 | 0.95 |
| R2 | 0.9  | 1    | 0.85 | 0.2 | 0.9 | 0.9  |
| R3 | 0.9  | 0.85 | 1    | 0.2 | 0.3 | 0.9  |
| R4 | 0.2  | 0.2  | 0.2  | 1   | 0.5 | 0.4  |
| R5 | 0.9  | 0.9  | 0.3  | 0.5 | 1   | 0.7  |
| R6 | 0.95 | 0.9  | 0.9  | 0.4 | 0.7 | 1    |

— CONVENTIONAL PAGING ZONE BOUNDARY
⬢ CELL IN USER SPECIFIC PAGING ZONE

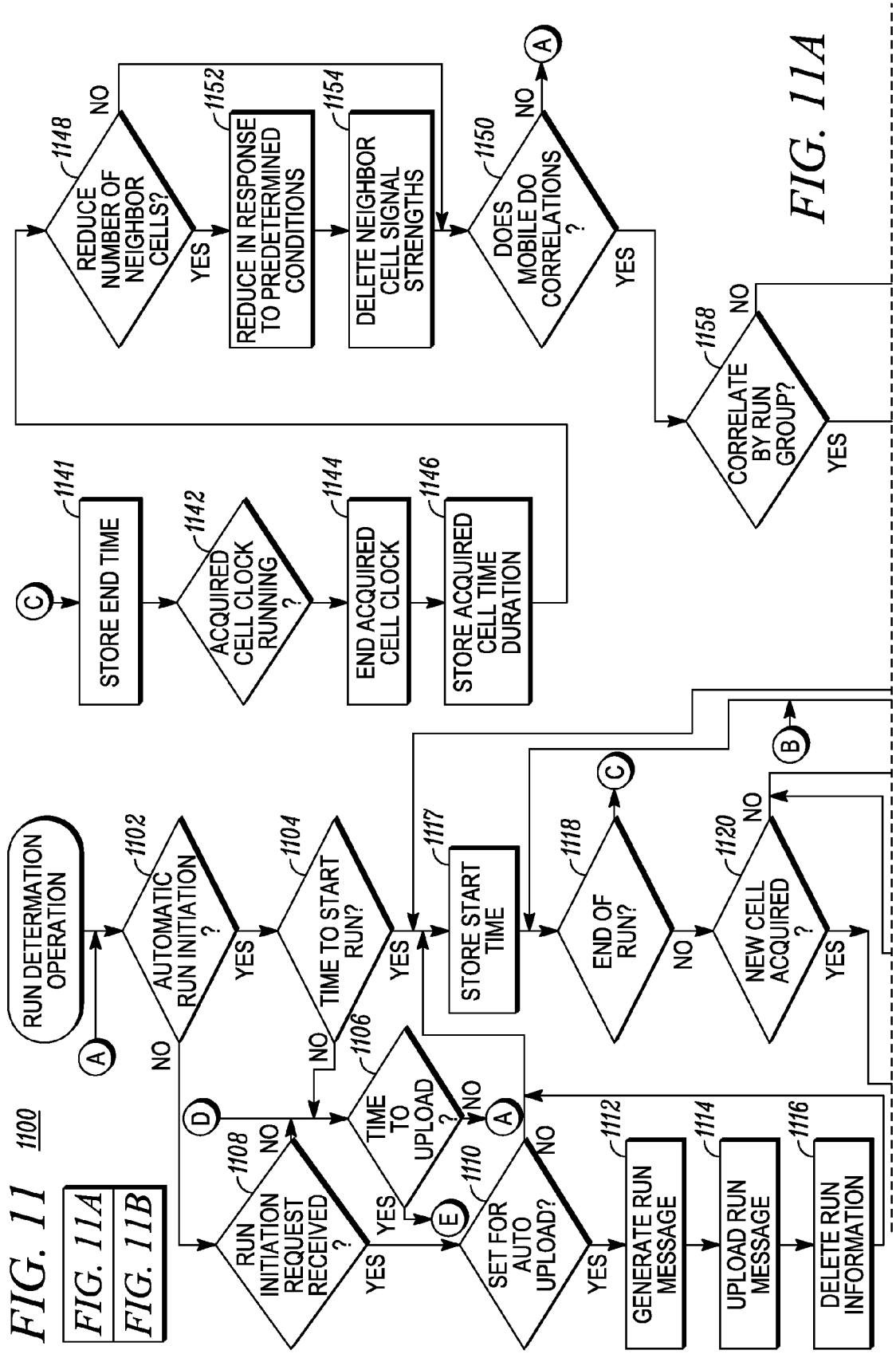

METHOD AND APPARATUS FOR TARGETED PAGING IN A MULTI-CELL WIRELESS COMMUNICATION SYSTEM

FIELD OF THE INVENTION

The present invention generally relates to multi-cell wireless communication systems, and more particularly relates to a method and apparatus for reduced area targeted paging of mobile stations in a multi-cell communication system.

BACKGROUND OF THE DISCLOSURE

In many multi-cell wireless communication systems which include a mobile communication device which can communicate with the network or with other communication devices through the network, such as cellular network communication systems, it may be necessary for the network to quickly access the mobile communication device. When the mobile communication device is actively communicating on the network or registered with the network, the mobile communication device is easily accessible. At other times, however, the network must utilize other means to quickly locate the mobile communication device.

Paging is typically utilized by the network to locate the mobile communication device when there is, for example, an incoming call, a text message or some type of data for the mobile communication device. The mobile communication device is typically paged by the network in a group of cells of the multi-cell communication system. If the mobile communication device is in one of the paged cells, it responds in that cell by sending a page response to the base station of that cell. The network then establishes a traffic channel to connect the incoming call or to send the text message or the data to the mobile communication device.

If, on the other hand, the mobile communication device is not in one of the cells paged, the network does not receive a response and, consequently, pages a larger group of cells. This procedure is continued for two or three cycles and, if there is no response, the network regards the mobile communication device as not locatable and either sends the call to voice mail or keeps the text message or data for later transmission. This procedure, however, has several drawbacks. Paging capacity is a major design consideration for all multi-cell communication systems because paging takes up downlink resources. Therefore, it is always advantageous to try to minimize the number of cells in which a mobile communication device is paged.

Conventional methods for targeted paging utilize less network resources by paging for the mobile communication device in a number of cells determined by either distance or zones. Distance-based targeted paging transmits paging messages for the mobile communication device in all network cells within an area defined by a predetermined radius from a cell in which the network has previously accessed the mobile communication device. Distance-based targeted paging, however, utilizes a large amount of network resources with only a possibility of locating the mobile communication device dependent solely upon how far the mobile communication device has moved since its last contact with the network.

Zone-based targeted paging transmits paging messages for the mobile communication device in network cells within a predetermined group of contiguous cells called a paging zone. Traditionally, paging zones are defined to minimize the area over which a mobile communication device is paged. When a mobile communication device enters the paging zone it indicates to the network that it is in the paging zone and the network pages the mobile communication device only in the cells of that paging zone. While paging zones can provide a large reduction in avoidable paging, paging zones as they are defined today are far from ideal. A mobile communication device user is generally in one of a group of cells a majority of the time and these cells do not necessarily coincide with the paging zone. Different users spend more or less time in different cells and paging zones are insensitive to individual user mobility patterns.

Thus, there is an opportunity to provide a robust and dynamic procedure for construction of more accurate and more reliable paging zones to increase paging efficiency and decrease delays in call setup as well as decrease paging impact on network resources and bandwidth. Furthermore, other desirable features and characteristics of the present invention will become apparent from the subsequent detailed description of the invention and the appended claims, taken in conjunction with the accompanying drawings and this background of the disclosure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is a table of run information obtained by the mobile communication device of the multi-cell communication system of FIG. 1 in accordance with the embodiment of the present invention;

Figure 1:
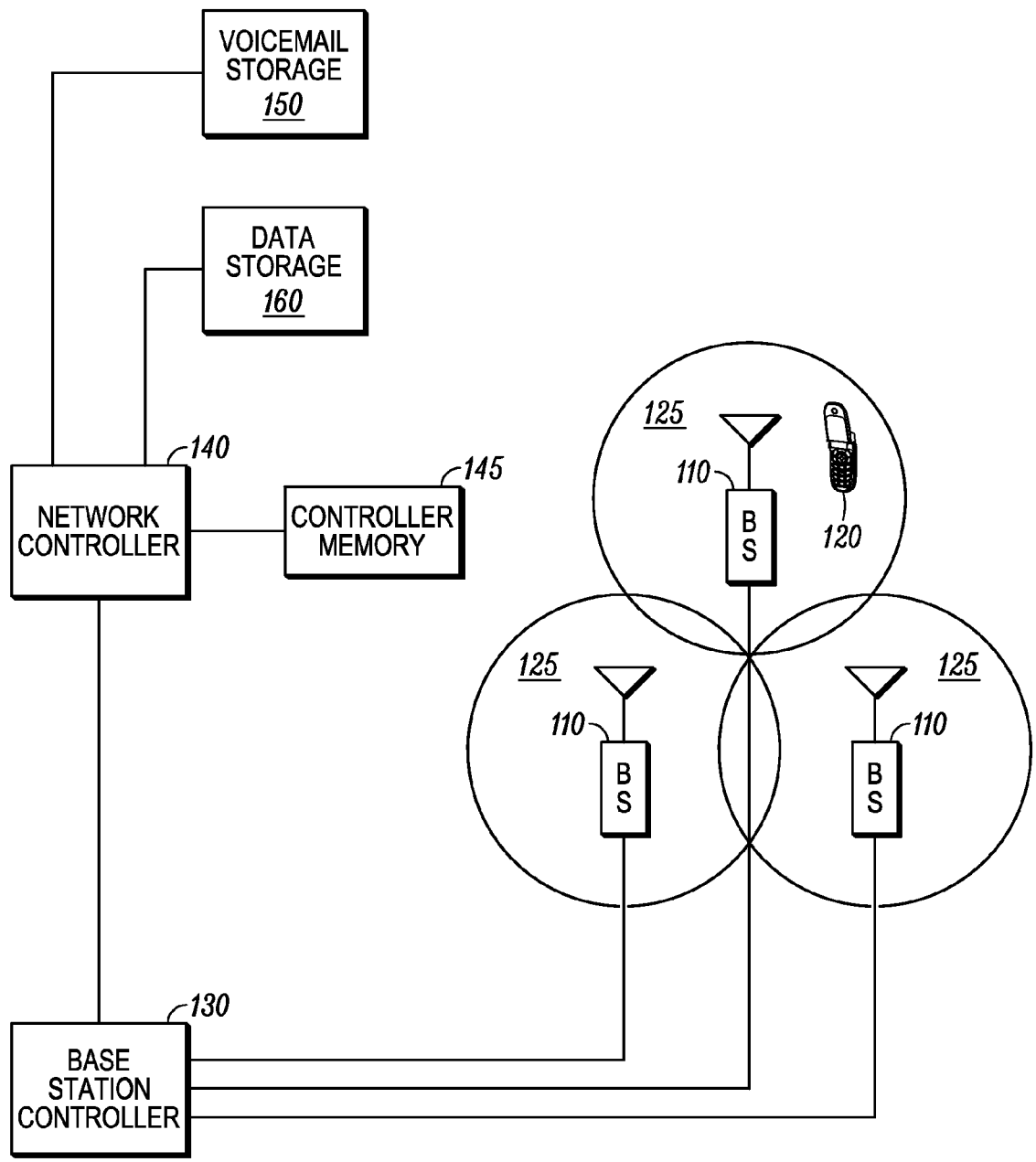
FIG. 1 is a diagram of a multi-cell communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to optimized targeted paging of mobile communication devices in a multi-cell wireless communication system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the targeted paging of a mobile communication device described herein. The non-processor circuits may include, but are not limited to, a radio frequency transceiver, clock circuits, power source circuits, and user input devices. As such, these functions may be interpreted as steps of a method to perform targeted paging in a multi-cell wireless communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Accordingly, a method is provided for optimizing paging of a mobile communication device in cells of a multi-cell communication system. The method includes the steps of defining a user specific paging zone for the mobile communication device and paging the mobile communication device within the user specific paging zone, wherein the user specific paging zone includes a portion of the cells selected in response to acquired cells acquired during one or more mobile communication device runs and neighbor cells adjacent to the acquired cells that are detected by the mobile communication device during the one or more mobile communication device runs.

A method is also provided for determining whether two geographical routes traversed by a mobile communication device are geographically similar. This method includes the steps of generating a first geographical route run by identifying at least one or more cells acquired by the mobile communication device as it traverses the first geographical route, generating a second geographical route run by identifying at least one or more cells acquired by the mobile communication device as it traverses the second geographical route, calculating a correlation factor by correlating the second geographical route run with the first geographical route run, and determining that the second geographical route run is geographically similar to the first geographical route run in response to the correlation factor being greater than a predetermined threshold value.

A multi-cell communication system is also provided which includes a plurality of cells, a network controller, and a mobile communication device. Each of the plurality of cells has one of a plurality of base stations located therein for transmitting and receiving radio frequency (RF) signals. The network controller is coupled to each of the plurality of base stations and provides information thereto for transmission as RF signals within an associated one of the plurality of cells, the network controller also receiving information from the plurality of base stations that is received from RF signals transmitted in the associated one of the plurality of cells. The mobile communication device travels within the plurality of cells during one or more mobile communication device runs and detects RF signals transmitted from one of the plurality of base stations, the mobile communication device providing run information to the network controller identifying ones of the plurality of cells that are acquired cells acquired during the one or more mobile communication device runs and ones of the plurality of cells that are neighbor cells detected during the one or more mobile communication device runs. The network controller defines a user specific paging zone for the mobile communication device, the user specific paging zone including a portion of the plurality of cells selected in response to the run information received from the mobile communication device.

A mobile communication device is also provided which includes a radio frequency (RF) antenna for receiving and transmitting RF signals, transceiver circuitry coupled to the RF antenna, a storage element, and a controller. The transceiver circuitry receives, demodulates and decodes RF signals to recover information therefrom. The transceiver also encodes information, modulates the encoded information into signals and provides the signals to the RF antenna for transmission therefrom as RF signals. The controller is coupled to the transceiver circuitry for receiving recovered information therefrom, generating acquired cell data from the recovered information, the acquired cell data identifying one or more cells acquired by the mobile communication device during a predetermined time frame. The controller also generates run information and stores the run information in the storage element, the run information including the acquired cell data. Thereafter, the controller generates a mobile communication device run message in response to the run information and provides the mobile communication device run message to the transceiver circuitry for transmission from the mobile communication device.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a multi-cell wireless communication system 100 in accordance with an embodiment of the present invention includes a plurality of base stations 110 and a wireless communication device 120. The plurality of base stations 100 communicate with the wireless communication device 120 via radio frequency (RF) signals. Associated with each of the plurality of base stations 110 is a coverage area or cell 125 wherein the wireless communication device 120 can receive signals from and transmit signals to such one of the plurality of base stations 110.

A group of base stations 110 are coupled to a base station controller 130 for control of signaling with each of the plurality of base stations 110. Each of the base station controllers 130 is coupled to a network controller 140 for control of communications in the plurality of cells 125 throughout the wireless communication system 100. The functionality of the network controller 140 as described herein could be a network controller 140 within a wireless system controller or a base station controller which is coupled to a large number of cells covering a large geographical area. The network controller 140 can access the base station controller 130 to transmit paging information as RF signals to one or more cells 125 of the wireless communication system 100 to locate a wireless communication device 120 in accordance with an embodiment of the present invention. Coupled to the network controller 140 is a controller memory 145 which is a storage component which stores data utilized by the network controller 140 for communication throughout the plurality of cells 125.

In addition, the network controller 140 is coupled to a voicemail storage component 150 and a data storage component 160. When a wireless communication device 120 cannot be located, the network controller 140 can establish a traffic channel with the voicemail storage 150 in a manner well-known to those skilled in the art so that a caller can leave a voicemail message for the wireless communication device 120. If a caller is attempting to send data, such as a text message, to the wireless communication device 120 and the network controller 140 cannot locate the wireless communication device 120, the network controller can access the data storage 160 to store the data for later retrieval by the wireless communication device 120.

Paging is utilized by the network controller 140 to locate the mobile communication device 120 when an incoming call, a text message or some type of data has been received by the network controller for the mobile communication device. Conventionally, paging zones include a group of contiguous cells 125 and are defined to minimize the area over which a mobile communication device 120 is paged. Identification of the paging zones is stored in the controller memory 145 for access by the network controller 140. When the mobile communication device 120 enters a network-defined paging zone, the mobile communication device 120 sends a message to the network controller 140 indicating that the mobile communication device 120 is in the paging zone and the network controller 140 stores information identifying the mobile communication device 120 and the paging zone in the controller memory 145. Thereafter, the network controller 140, utilizing the information in the controller memory 145, pages the mobile communication device 120 only in the cells of such paging zone until notified differently.

A mobile communication device 120, however, is generally in one of a group of cells a majority of the time, such as cells 125 covering the user's home or office. These typically-occupied cells do not necessarily coincide with any paging zone. In addition, different users spend more or less time in different cells and network-defined paging zones are insensitive to individual user mobility patterns. In accordance with the embodiment of the present invention, the mobile communication device 120 is paged in a user-specific paging zone. Utilizing user-specific paging zones in accordance with the embodiment of the present invention, optimizes targeted paging of the mobile communication device 120 and advantageously provides a larger reduction in avoidable paging than currently used zone-based paging approaches.

Figure 2B:
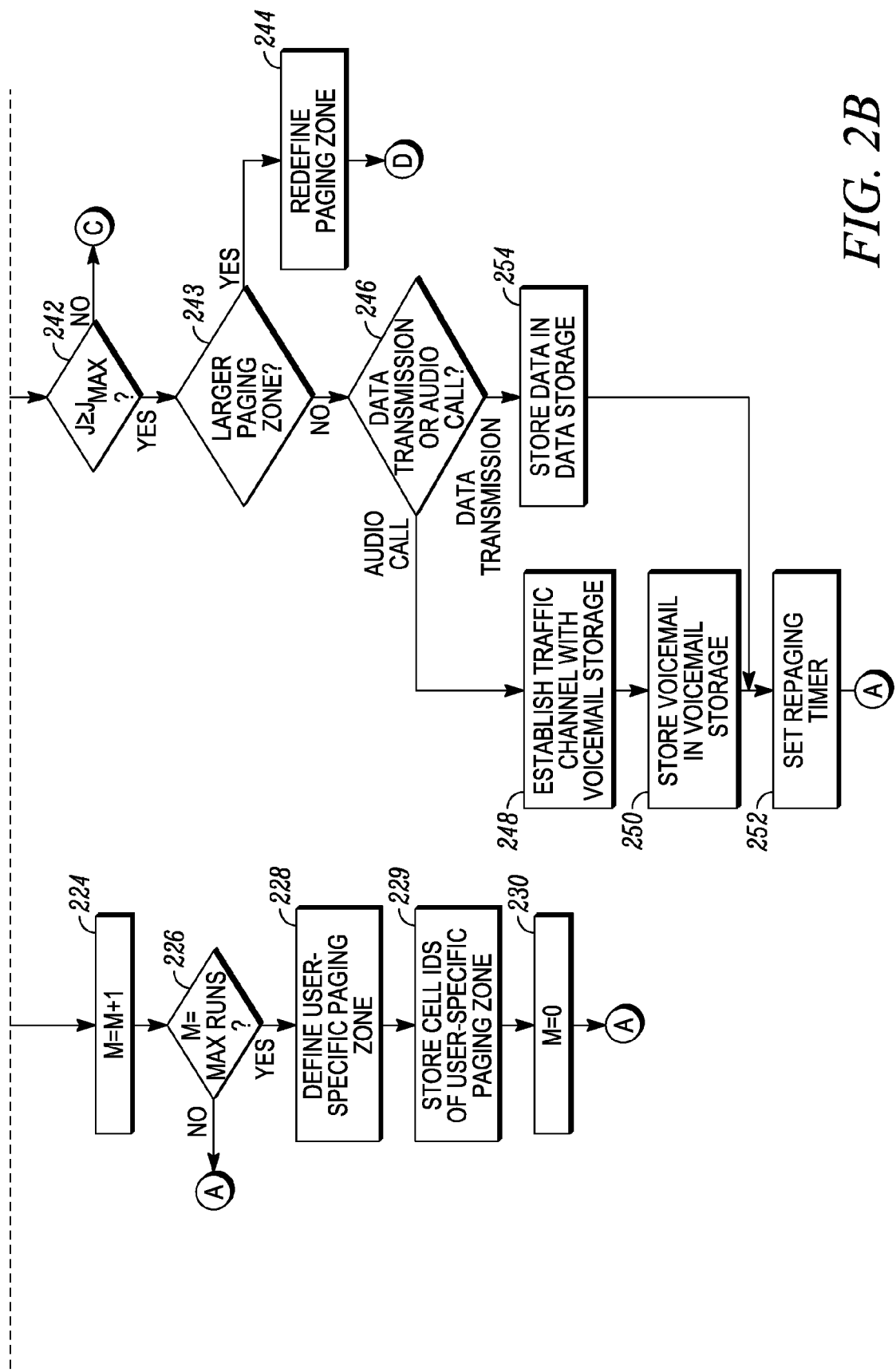
FIG. 2 is a flowchart of a targeted paging operation of the network controller of the multi-cell communication system of FIG. 1 in accordance with the embodiment of the present invention.

FIG. 2 depicts a flowchart of a targeted paging operation 200 of the network controller 140 in accordance with the embodiment of the present invention which includes an optimized mechanism for constructing user-specific paging zones for the targeted paging operation 200.

Initially, a stored run counter (M) is set to zero 201 and the targeted paging operation 200 determines whether an upload of run information to the network controller 140 from a wireless communication device 120 has been detected 202, determines whether a call setup request 204 or a data transmission request 206 has been received for a wireless communication device 120, or determines whether it is time to repage 208 a wireless communication device 120.

When the network controller 140 detects an upload of run information 202 from a wireless communication device 120, the network controller defines or redefines a user-specific paging zone for the wireless communication device 120. Paging zones are a plurality of cells 125. In order to define a user-specific paging zone, the network controller 140 utilizes run information uploaded from the wireless communication device 120. The run information identifies cells that the wireless communication device 120 has detected in the course of a run, where a run is a space-time map of a portion of the plurality of cells 125 of the network 100 detected by the wireless communication device 120 during a predetermined time frame. For example, run information could capture the sequence of cells visited by the wireless communication device 120 during a span of twelve hours.

The run information identifies acquired cells (i.e., cells that the wireless communication device 120 has acquired during the predetermined time frame) and neighbor cells. The neighbor cells are cells that meet certain predetermined conditions. For example, neighbor cells can be defined as cells adjacent to the acquired cells from which the wireless communication device 120 has detected signal strengths within certain parameters. FIG. 3 depicts a table 300 of run information uploaded from the mobile communication device 120. The run information includes a start time 302 and an end time 304 of the initial run, as well as a plurality of acquired cells 306 acquired during the run. For each acquired cell 306, the run information includes the amount of time 308 spent in the acquired cell 306 and all neighbor cells 310 detected while the mobile communication device 120 is in the acquired cell 306. The neighbor cells 310 identified in the uploaded run information can be limited to those neighbor cells 310 from which the mobile communication device 120 detected RF signals having a signal strength greater than a predetermined signal strength or maximum detected signal strength information for each of the neighbor cells 310 can be included in the run information so that the network controller 140 can process the neighbor cells 310 by determining which meet certain predetermined conditions.

Figure 4:
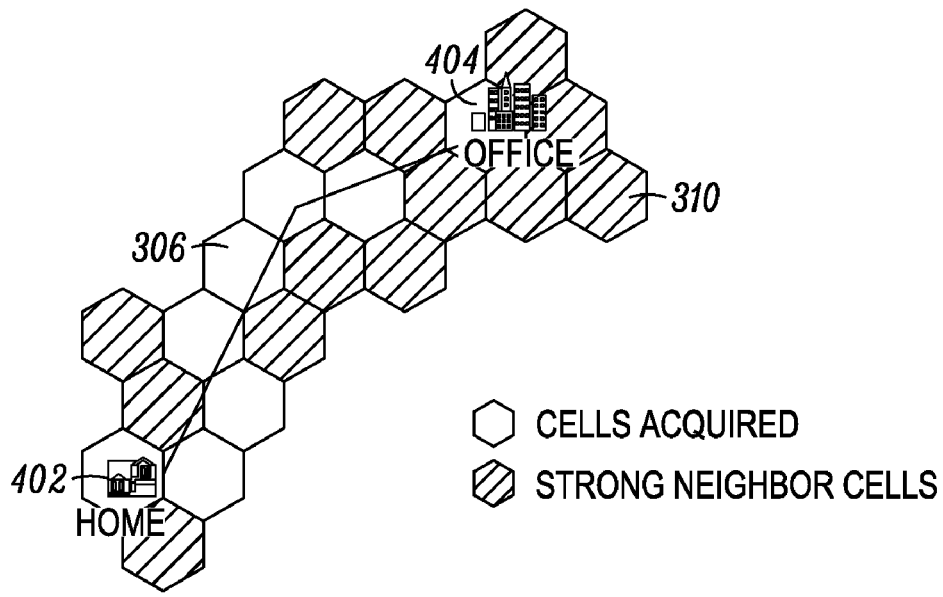
FIG. 4 is a cell diagram highlighting acquired cells and neighbor cells identified in a first run information set in accordance with the embodiment of the present invention.

Referring to FIG. 4, a diagram 400 plots the cells of a first run information set recorded by the mobile communication device 120 traveling between a user's home 402 and the user's office in a metropolitan area 404. The acquired cells 306 and the neighbor cells 310 are identified in the diagram 400.

Returning to the user-specific paging zone defining portion of the targeted paging operation 200, if uploaded run information is detected 202 and the stored run counter M is not greater than zero 210 for the particular mobile communication device 120 (i.e., a stored run counter M equal to zero indicates that the run information received is for an initial run of a run-group used to define a user-specific paging zone in accordance with the embodiment of the present invention), the network controller 140 examines the run information and identifies the acquired cells 212 in the initial run, identifies the neighbor cells 214 in the initial run, and stores the run information 216 as a run information set in the controller memory 145. In identifying the neighbor cells 214 for each acquired cell, the network controller 140 processes such neighbor cells in response to predetermined conditions, such as deleting the identity of any neighbor cell having a maximum detected signal strength below a predetermined signal strength, or deleting all of the neighbor cells except a predetermined number of the neighbor cells having the strongest signals. Alternatively or additionally, the network controller 140 can process the run information, such as identifying the neighbor cells 214 for each acquired cell, in response to the time spent by the mobile communication device 120 in the acquired cell.

Figure 5:
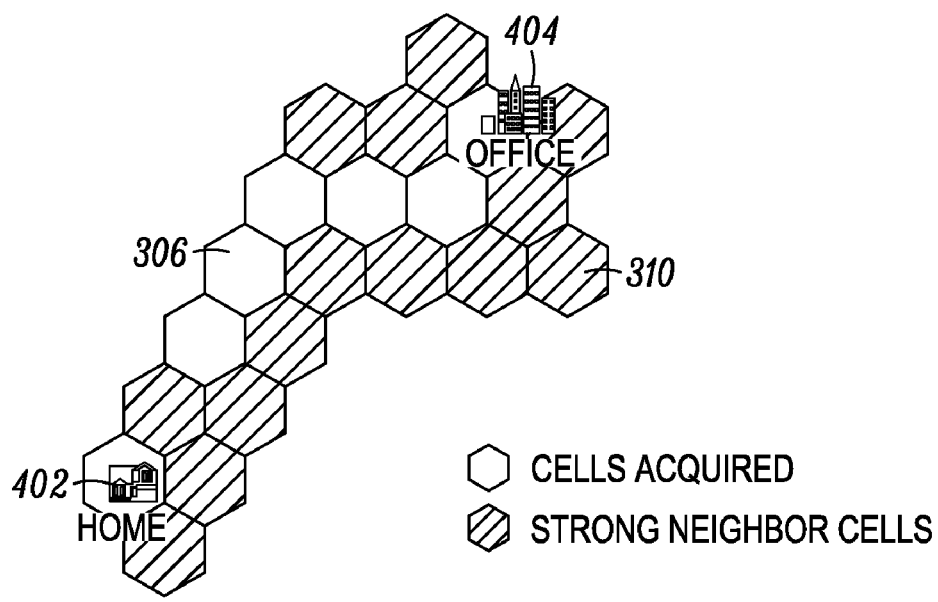
FIG. 5 is a cell diagram highlighting acquired cells and neighbor cells identified in a second run information set in accordance with the embodiment of the present invention.

After the initial run information is stored 216, the stored run counter M is incremented by one 217, and processing returns to await the reception of additional information from 202 or for 204, 206 the wireless communication device 120 or detecting a time for repaging 208 the wireless communication device 120. When uploaded run information is detected 202 for a run subsequent to the initial run (i.e., M is greater than zero) 210, the acquired cells are identified 218 and the neighbor cells are identified 220. Referring to FIG. 5, a diagram 500 plots the acquired cells 306 and the neighbor cells 310 of the second run information set recorded by the mobile communication device 120 traveling between the user's home 402 and the user's office in the metropolitan area 404. The subsequent run information is correlated 222 with the previously stored run information in accordance with any suitable correlation function.

For example, the subsequent run information can be correlated with stored run information 222 in response to the closeness of the geographical routes "mapped" by the cells of the runs identified by the stored run information and the subsequent run information. Alternatively, the subsequent and stored run information can be correlated 222 in response to the proportion of the number of cells different in the subsequent run information from the stored run information to the number of cells in the subsequent run information being below a predetermined percentage. Or, the subsequent and stored run information can be correlated 222 in response to cell identification information and the time spent by the mobile communication device 120 in cells identified in both run information sets or cells identified in one run information set and not in the other run information set.

In accordance with the embodiment of the present invention, a correlation factor is calculated 222 in response to the subsequent run information set and each of the stored run information sets. This correlation factor is defined by the function $Corr(R_i, R_j)$, where $R_i$ and $R_j$ are different runs and where the correlation factor is large if $R_i$ and $R_j$ are similar runs. For each of two runs R1 and R2, C(R1,R2), defined as the correlation of R2 with respect to R1, is first computed and then C(R2,R1) (i.e., the correlation of R1 with respect to R2) is computed. Within the above parameters, many formulas can be used to calculate the correlation factor. For example, the correlation factor of the two runs, Corr(R1, R2), may be computed as $$Corr(R1,R2) = \sqrt{C(R1,R2) \times C(R2,R1)} \quad \text{(Equation 1)}$$

After calculation 222, the correlation factors of the run information set for run R1 with each of the stored run information sets are stored 223 and the stored run counter M is incremented by one 224. If the stored run counter M has not reached a predetermined maximum number of runs (MaxRuns) 226, processing returns to steps 202, 204, 206 and 208. When the stored counter M equals MaxRuns 226, the network controller 140 defines the user-specific paging zone 228 for the mobile communication device 120.

Figures 6, 7:
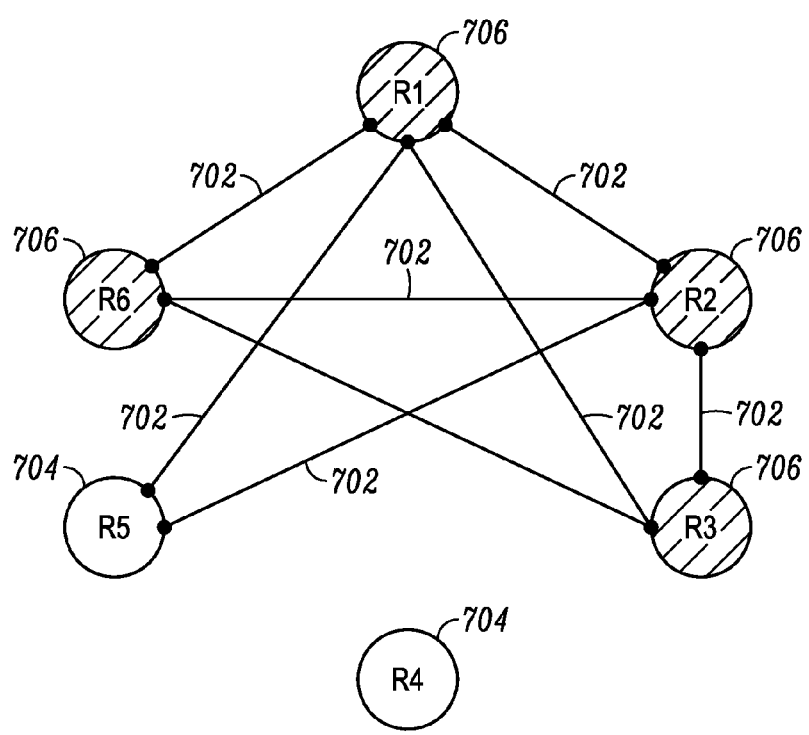
FIG. 6 is a correlation table of information obtained during the targeted paging operation of FIG. 2 in accordance with the embodiment of the present invention.
FIG. 7 is a diagram depicting results of the targeted paging operation of FIG. 2 in accordance with the embodiment of the present invention.

Referring to FIG. 6, a table shows the correlation factors for each pair of runs $R_1, R_2, \ldots R_6$, where six is the predetermined maximum number of runs, MaxRuns. In accordance with the embodiment of the present invention, the relationship of the correlation factors is determined to define a run-group as the user-specific paging zone 228. FIG. 7 depicts a diagram 700 illustrating the calculation of the run-group. Each run $(R_1, R_2, \ldots R_6)$ is a vertex of the diagram 700. A line 702 is added between a pair of vertices where the correlation factor calculated for that pair of runs is greater than a correlation threshold value. Using table 600 and a correlation threshold value of 0.8, eight lines (corresponding to eight correlation factors greater than 0.8) appear in the diagram 700 connecting vertices $R_1, R_2, R_3, R_5$ and $R_6$. A run-group is a subgroup of the vertices in which every pair of vertices has a line 702 connecting them. In diagram 700, vertices 704 (i.e., runs $R_1, R_2, R_3$ and $R_6$) form a run-group. Vertices 706 are not in the run-group because runs $R_4$ and $R_5$ do not have lines 702 connecting them with all other vertices. The user-specific paging zone is then defined 228 as the run-group consisting of vertices 704.

After definition of the user-specific paging zone 228, the cells of the user-specific paging zone are stored 229 in the controller memory 145 and the stored run counter M is reinitialized to zero 230. Processing then returns to await the reception of additional information from 202 or for 204, 206 the wireless communication device 120 or detecting a time for repaging 208 the wireless communication device 120.

When a call setup request 204 or a data transmission request 206 is received for the wireless communication device 120, the network controller 140 sets a paging counter (J) to zero 231 and provides page information to base stations 110 in cells 125 of a paging zone for paging 232 the mobile communication device 120. In accordance with the embodiment of the present invention, if a user-specific paging zone has been defined 228 and stored 229 in the controller memory 145 for the mobile communication device 120 being paged 232, the page information is provided to the base stations 110 in cells 125 of the user-specific paging zone in order to page 232 for the mobile communication device 120. If no user-specific paging zone for the mobile communication device 120 is stored in the controller memory 145, the page information is provided to base stations 110 in cells 125 of a network-defined paging zone to page 232 the mobile communication device 120. Further, when a user-specific paging zone has been defined, but the mobile communication device 120 has notified the network controller 140 that it has left the user-defined paging zone (e.g., by registering in a cell 125 not within the user-defined paging zone), the network controller 140 will attempt to locate the mobile communication device in its last known location (e.g. the last known cell 125 or a network-defined paging zone defined in response to the last known cell 125).

Figure 8:
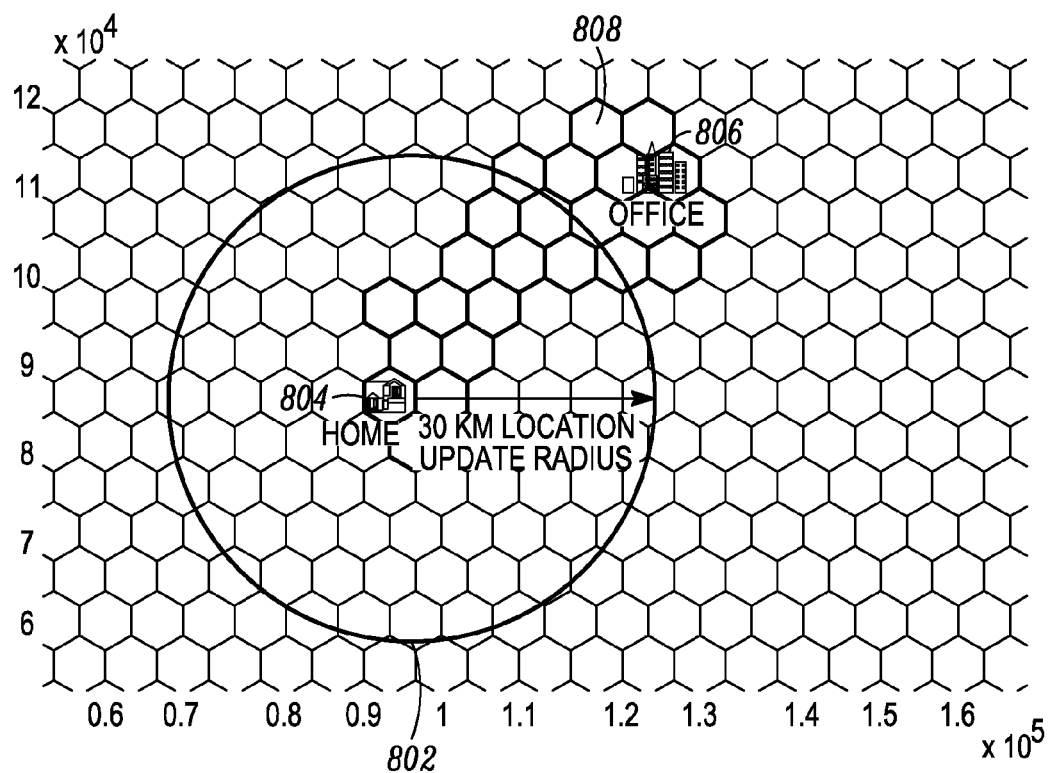
FIG. 8 is a cell diagram depicting a user specific paging zone in the multi-cell communication system of FIG. 1 in accordance with the embodiment of the present invention and a conventional distance-defined paging area.

As mentioned previously, the network-defined paging zone could be a distance-based or zone-based. Referring to FIG. 8, a typical distance-based paging zone 802 has a location update radius of thirty kilometers and all cells within the location update radius of the last cell 125 in which the mobile communication device 120 communicated (e.g., the home 804 of the mobile communication device 120) are within the paging zone 802. Thus, paging for the mobile communication device 120 in the distance-defined paging zone 802 requires transmitting a paging message for the mobile communication device 120 in more than ninety cells 125 and, if the user of the mobile communication device 120 is at his office 806, he will not receive the page. However, paging for the mobile communication device 120 in the user-specific paging zone 808, which includes both the mobile communication device 120 user's home 804 and office 806, only requires transmitting a paging message for the mobile communication device 120 in twenty-four cells 125, advantageously providing a substantial network savings in bandwidth usage and message throughput while providing a greater likelihood of contacting the mobile communication device 120.

Figure 9:
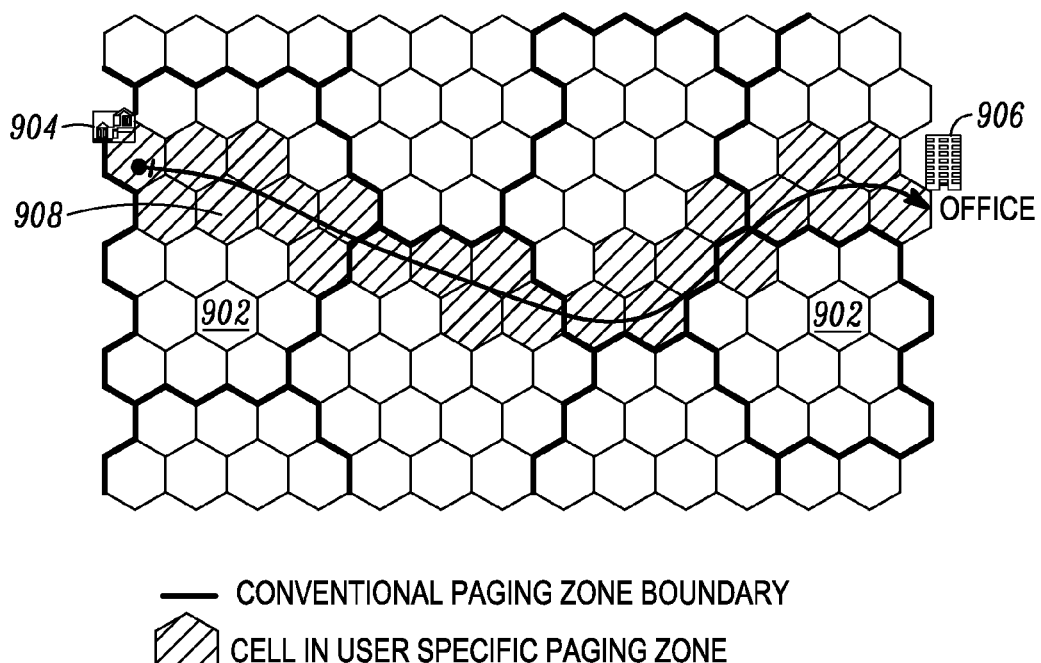
FIG. 9 is a cell diagram depicting a user specific paging zone in the multi-cell communication system of FIG. 1 in accordance with the embodiment of the present invention and conventional zone-defined paging areas.

Referring to FIG. 9, typical zone-based network-defined paging zones 902 are shown with thick zone boundaries and a network-defined paging zone 902 in which the mobile communication device 120 has communicated is paged. If the user of the mobile communication device 120 is at his home 904 or his office 906, he will likely receive the page. However, when commuting between the home 904 and the office 906, it is unlikely that the mobile communication device 120 will receive any such page, and multiple pages will need to be sent providing a burden on both the network controller 140 and the communication system 100 bandwidth. Yet, paging for the mobile communication device 120 in the user-specific paging zone 908, which includes the mobile communication device 120 user's home 804, office 806 and likely commute route, has a high degree of successfully contacting the mobile communication device 120, while advantageously providing a substantial network savings in both resources and bandwidth.

Thus, it can be seen that paging 232 the mobile communication device 120 in the user-specific paging zone provides significant advantages over paging 232 the mobile communication device 120 in network-defined paging zones. Referring back to the flowchart 200, after the mobile communication device 120 is paged 232, a page response counter (K) is initialized to zero 233 and the network controller 140 awaits reception of a paging response 234 from the mobile communication device 120. When a paging response is received 234, a traffic channel is established 236 with the mobile communication device 120 and processing returns to await reception of additional information from 202 or for 204, 206 the wireless communication device 120 or detecting a time for repaging 208 the wireless communication device 120.

If a paging response is not received 234 from the mobile communication device 120, the page response counter K is incremented by one 238 and examined to see if it has reached a maximum value (Kmax) 240 indicating that the network controller 140 has awaited a predetermined amount of time for a paging response from the mobile communication device 120. When the page response counter K is not greater than or equal to Kmax 240, processing returns to determine whether a paging response has been received 234 from the mobile communication device 120. When the page response counter K is greater than or equal to Kmax 240, the network controller 140 has awaited the paging response for the predetermined time. The paging counter J is incremented by one 241 and is checked to determine if the paging counter J is greater than or equal to a maximum paging counter (Jmax) 242 indicating that the mobile communication device 120 has been paged a network-defined maximum predetermined number of times. If the paging counter J is not greater than or equal to the maximum paging counter value Jmax 242, processing returns to page the mobile communication device 120 again 232.

When the paging counter J is greater than or equal to Jmax 242, the network controller 140 has paged the mobile communication device the predetermined maximum number of times. The network controller 140 then determines 243 whether there are sufficient network 100 resources and an alternate paging zone in which to page for the mobile communication device 120. If there are such resources or an alternate paging zone 243, the paging zone for the mobile communication device is redefined 244 and processing returns to re-initialize the paging counter J to zero 231 and page the mobile communication device 120 in the redefined paging zone 232.

If, on the other hand, there are no such resources or alternate paging zones 243, processing determines from the setup message received whether the message intended for the mobile communication device 120 is an audio call or a data transmission 246. If the message is an audio call 246 (i.e., a call setup request was received 204), a traffic channel is established 248 with the voicemail storage component 150, a voicemail is received and stored 250 in a manner well-known to those skilled in the art, and a repaging timer is set 252 in the network controller 140. Processing then returns to await reception of additional information from 202 or for 204, 206 the wireless communication device 120 or detecting a time for repaging 208 the wireless communication device 120.

If a data transmission request was received 206 and the message is a data transmission 246, such as a text message, the network controller stores the data 254 in the data storage component 160 in a manner well-known to those skilled in the art, and a repaging timer is set 252 in the network controller 140. Processing then returns to await reception of additional information from 202 or for 204, 206 the wireless communication device 120 or detecting a time for repaging 208 the wireless communication device 120. When the network controller 140 determines from the repaging timer that it is time to repage 208 the mobile communication device 120, the paging counter J is re-initialized to zero 231 and the mobile communication device 120 is paged 232 in the paging-zone associated with the mobile communication device 120.

Since RF conditions at a given location and user travel patterns are variable, it is necessary to have a robust mechanism that defines reliable paging zones. In accordance with the embodiment of the present invention, user-specific paging zones can be defined and utilized. Definition of the user-specific paging zones in accordance with the embodiment of the present invention provide increased paging efficiency resulting in reduced delays in call setup. In order to collect appropriate run information for defining such user-specific paging zones, it is necessary for the mobile communication device 120 to record sufficient run information and upload that information to the network controller 140.

Figure 10:
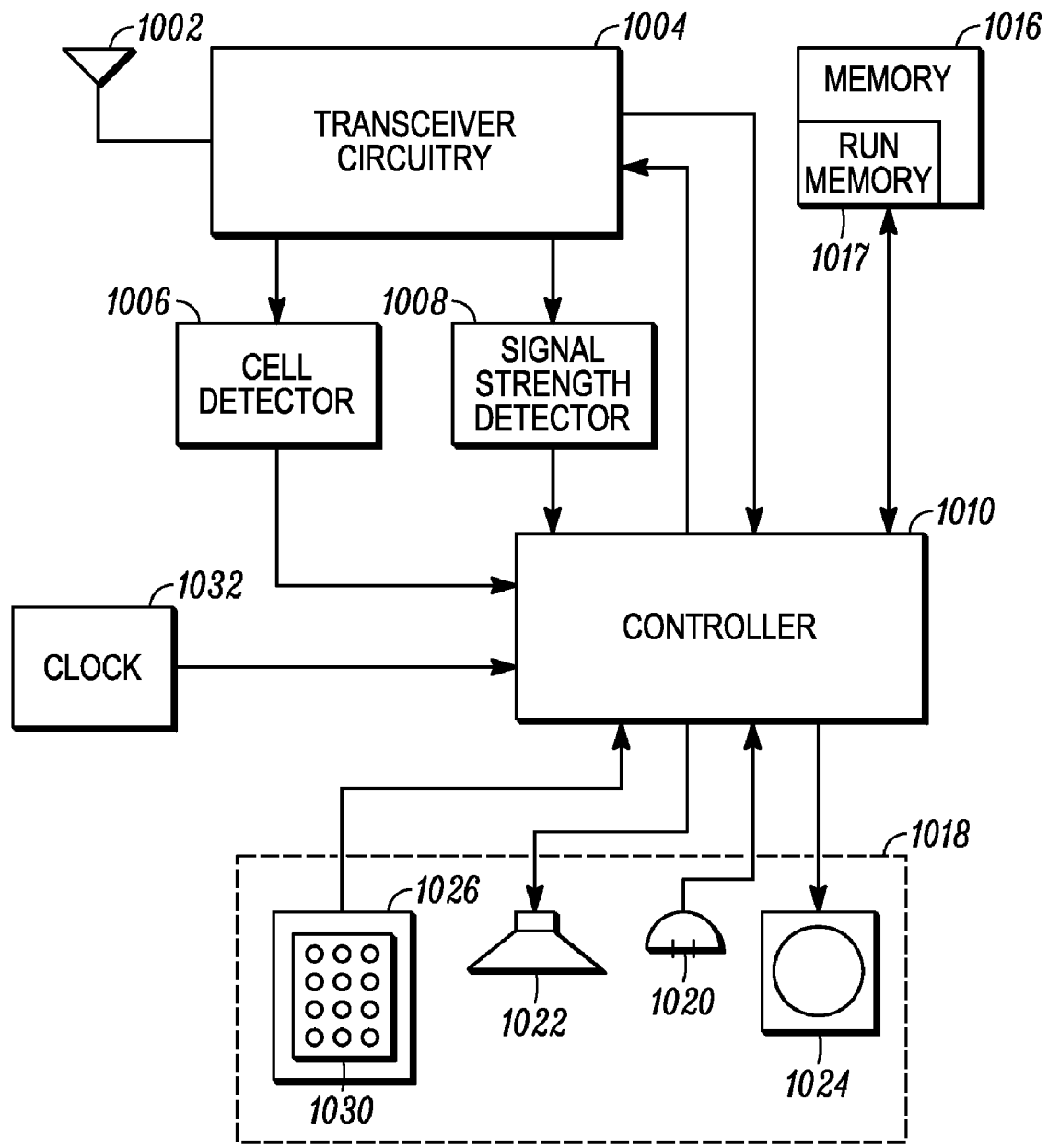
FIG. 10 is a block diagram of a mobile communication device for use in the multi-cell communication system of FIG. 1 in accordance with the embodiment of the present invention.

Referring to FIG. 10, a mobile communication device 120 in accordance with the embodiment of the present invention is shown. The mobile communication device 120 includes an antenna 1002 for receiving and transmitting radio frequency (RF) signals. Transceiver circuitry 1004 is coupled to the antenna 1002 and, in a manner familiar to those skilled in the art, demodulates and decodes the RF signals received from the base stations 110 (FIG. 1) to recover information therefrom. The transceiver circuitry 1004 is coupled to a controller 1010 for providing the decoded information thereto for utilization by the controller 1010 in accordance with the function(s) of the mobile communication device 120. The controller 1010 also provides information to the transceiver circuitry 1004 for encoding and modulating information into RF signals for transmission from the antenna 1002.

In accordance with the embodiment of the present invention, a cell detector 1006 and a signal strength detector 1008 receive signals from a receiver portion of the transceiver circuitry 1004. The cell detector 1006 operates in a manner well-known to those skilled in the art to recover cell 125 identification information, such as identification information for a base station 110 in the cell 125, from network control information received by the mobile communication device 120 as it travels through the plurality of cells 125 of the wireless communication system 100. The signal strength detector 1008 is coupled to specific receiver circuitry elements within the transceiver circuitry 1004 in a manner well-known to those skilled in the art to determine a signal strength value of an RF signal received from a cell 125. While depicted in FIG. 10 as elements of the mobile communication device 120 separate from the controller 1010, the functionality of the cell detector 1006 and the signal strength detector may be implemented within the controller 1010.

As is also well-known in the art, the controller 1010 is coupled to a memory device 1016 and user interface devices 1018 to perform the functions of the mobile communication device 120. In accordance with the embodiment of the present invention, the memory 1016 includes a run memory portion 1017 thereof for storing information gathered by the mobile communication device 120 during a run determination operation, such as the run determination operation depicted and described in FIG. 11 hereinbelow. The user interface devices 1018 may include a microphone 1020, a speaker 1022 and a display 1024. The user interface 1018 may also include one or more key inputs 1026, including a keypad 1030.

Figure 11B:
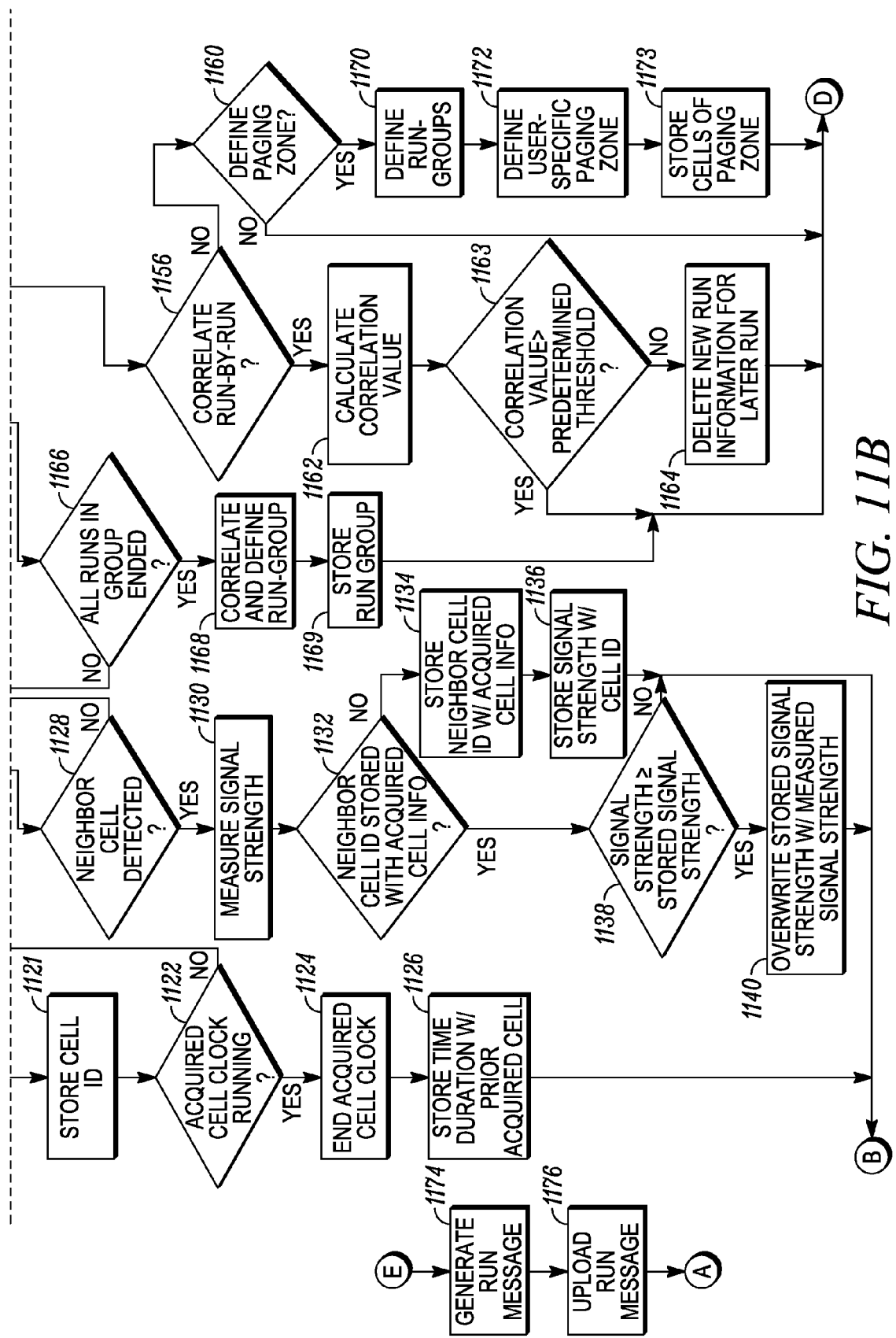
FIG. 11 is a flowchart of a mobile communication device run determination operation of the controller of the mobile communication device of FIG. 10 in accordance with the embodiment of the present invention.

The run memory device 1017 and a clock signal generator 1032 are utilized by the controller 1010 for the recording of run information in accordance with the embodiment of the present invention, the controller 1010 periodically providing the run information to the transceiver circuitry 1004 for uploading to the network controller 140 in accordance with a run determination operation of the controller 1010 as described in more detail in FIG. 11.

Depending on the setup of the network controller 140 and the operation of the controller 1010 of the mobile communication device 120, run information for defining user-specific paging zones in accordance with the embodiment of the present invention can be gathered in several ways. The network controller 140 may be in charge of collecting the run information and may signal the mobile communication device 120 to start or end a run or to upload run information at a low network traffic time, such as during the nighttime.

In other modes for gathering the run data in accordance with the embodiment of the present invention, sometimes referred to as intelligent paging zone creation, the intelligence for creating the user-specific paging zones is within the wireless communication system 100 outside the network controller 140 (e.g., in the mobile communication device 120).

One type of intelligent paging zone creation, sometimes referred to as "user triggered", requires run information to be gathered during a recording period that is triggered by the user of the mobile communication device 120. For example, a mobile communication device 120 user "trains" the mobile communication device 120 by initiating a run at the start of a routine commute drive and ending the run at the end of the routine commute drive. During each run, the mobile communication device 120 records run information in accordance with a run determination operation. After each run, the mobile communication device 120 uploads the run information stored during the run to the network controller 140. In this manner, the mobile communication device 120 records successive runs until a predefined number of runs are completed. The network controller 140 then defines the user-specific paging zone as described above.

Another example of intelligent paging zone creation is referred to as automated paging zone creation. During automated paging zone creation, the mobile communication device 120 is set up to automatically "train" between certain hours of the day (i.e., a predetermined time frame). The mobile communication device 120 generates successive runs based on its mobility during the predetermined time frame in accordance with a run determination operation. Thereafter, run information listing cells stored by the mobile station as it moves during the predetermined time frame is uploaded to the network controller 140. In accordance with the embodiment of the present invention, the duration of a run is a predetermined portion of a day or all of the day, so that the typical user mobility can be recorded.

In addition to gathering run information by "training" the mobile communication device 120 and uploading the run information to the network controller 140 for definition of user-specific paging zones, some of the computation required for defining the user-specific paging zones may be handled by the mobile communication device 120 during performance of a run determination operation for intelligent paging zone creation. Accordingly, referring to FIG. 11, a flowchart 1100 of one such run determination operation of the controller 1010 in accordance with the embodiment of the present invention initially determines whether the mobile communication device 120 is set to automatically start the run determination operation or not 1102. If the mobile communication device 120 is set to automatically start the run determination operation 1102, the controller 1010 determines, in response to the clock signal from the clock 1032 and the settings for the automatic run determination operation, whether it is time to start a run determination 1104.

If it is not time to start a run determination 1104, processing determines, either in response to the clock signal and the settings for the automatic run determination operation or in response to some other parameter, whether it is time to upload run information 1106 to the network controller 140. For example, the controller 1010 can determine to upload run information 1106 in response to the amount of run information stored in the memory 1016 or in response to reception of a run upload request transmitted by the network controller 140. If it is not time to upload run information 1106, processing remains in a first idle loop until either it is time to start a run determination 1104 or time to upload run information 1106.

If, on the other hand, the mobile communication device 120 is not set to automatically start the run determination operation 1102, the controller 1010 determines whether a run initiation request has been received 1108. The controller 1010 determines whether a run initiation request has been received 1108 in response to, for example, a user input received from the user interface devices 1018 or information recovered from an RF signal received and decoded by the transceiver circuitry 1004, such as a run initiation message from the network controller 140. If a run initiation request has not been received 1108, processing determines whether it is time to upload run information 1106 to the network controller 140. If it is not time to upload run information 1106, processing remains in a second idle loop until either a run initiation request is received 1108 or it is time to upload run information 1106.

If a run initiation request has been received 1108, processing determines whether the run determination operation is set to automatically upload run information to the network controller 140 in response to the run initiation request 1110. If the run determination operation is set to automatically upload run information in response to the run initiation request 1110, a run message is generated 1112 from the run information stored in the memory 1016 and the run message is transmitted 1114 to the network controller, thereby uploading the run information. The run information stored in the memory 1016 is then deleted 1116.

When it is time to start a run 1104, or an initiation request has been received 1108 and either the controller 1010 is not operating in the automatic upload mode 1110 or, when operating in the automatic upload mode 1110, the run message has been generated 1112 and transmitted 1114, processing stores the time indicated by the clock signal from the clock 1032 as the start time for the run 1117 and determines whether a run recording time period has ended 1118. The end of the run can be determined 1118 in response to the end of a predetermined time period or in response to the number of runs completed and stored for upload.

When the end of the run has not been detected 1118, the controller 1010 determines whether a new cell 125 has been acquired 1120 in response to the output signals from the cell detector 1006 indicating that a cell 125 has been acquired having different cell identification information. When the run determination operation determines that a new acquired cell has been detected 1120, the acquired cell identification information is stored 1121 in the run memory 1017 and processing determines if the acquired cell clock is running 1122. If the acquired cell clock is running 1122 (i.e., the time duration in a previously acquired cell is being measured in accordance with a clock signal from the clock 1032), the acquired clock is stopped 1124 and the time duration measured by the acquired clock until it was stopped (at step 1124) is stored 1126 with the previously acquired cell identification information as part of the run information stored in the run memory 1017. Processing then returns to determine whether it is time to end the run 1118.

When a new cell is not acquired 1120 or when a previously acquired cell's clock is not running 1122 (e.g., the new acquired cell is the first cell acquired in a run), the controller 1010 checks the output signal from the cell detector 1006 and determines whether a cell 125 has been detected that is not an acquired cell 1128. Such a cell is referred to as a neighbor cell and, given the size of the cells and the strength of the signals transmitted by the base station 110 therein, is generally a cell 125 adjacent to the acquired cell. If a neighbor cell has not been detected 1128, processing returns to determine whether it is time to end the run 1118. In this manner, as the mobile communication device 120 travels through the wireless communication system 100 between a start time and an end time for a run, the run information is gathered and stored in the run memory 1017 to resemble the run information in the table 300 of FIG. 3.

When a neighbor cell is detected 1128, the controller 1010 measures the signal strength of the neighbor cell 1130 in response to the signal from the signal strength detector 1008. The controller 1010 then checks the run information stored in the run memory 1017 to determine whether the neighbor cell's identification information is already stored in the run memory 1017 in association with the presently acquired cell 1132. If the neighbor cell's identification information is not stored 1132 in the run memory 1017, the controller 1010 stores the neighbor cell identification information in the run memory 1017 in association with the presently acquired cell 1134 and stores the measured signal strength in association with the neighbor cell 1136 and processing returns to determine whether it is time to end the run 1118. If the neighbor cell's identification information is stored 1132 in the run memory 1017 in association with the acquired cell, the controller 1010 determines whether a signal strength stored in association with the stored neighbor cell identification information is less than the measured signal strength 1138.

When the signal strength stored in association with the stored neighbor cell identification information is less than the measured signal strength 1138, the measured signal strength is stored in the run memory in association with the neighbor cell overwriting the previously stored signal strength 1140. Processing then returns to determine whether it is time to end the run 1118. If the stored signal strength stored in association with the stored neighbor cell identification information is greater than the measured signal strength 1138, processing returns to determine whether it is time to end the run 1118 without altering the stored signal strength. In this manner, the greatest measured signal strength of each neighbor cell is maintained in the run memory 1017.

When it is time to end the run 1118, the controller 1010 stores in the run memory 1017 a time indicated by the clock signal from the clock 1032 as the end time of the run 1141 and determines whether the acquired clock is running 1142. When the acquired clock is running 1142, the acquired clock is stopped 1144 and the time duration measured by the acquired clock is stored 1146 in the run memory 1017 in association with the acquired cell information of the last acquired cell as cell time information.

After the time duration is stored 1146 or if the acquired clock is not running 1142, the controller 1010 determines from the parameters set for obtaining run information whether the controller 1010 reduces the set of neighboring cells in accordance with certain predetermined conditions 1148 prior to uploading the run information or, when the controller 1010 is assigned a larger role in the definition of the user-specific paging zone, performs correlation of multiple runs 1150 prior to uploading the run information. If the controller 1010 is not set to reduce the number of neighboring cells 1148 and is not assigned to perform run correlation 1150, the run information is complete and processing returns to begin another run 1004, 1008 or upload the run information 1006 to the network controller 140.

When the controller 1010 assumes the task of reducing the number of neighboring cells 1148, the controller performs task by selecting which neighboring cells are to be included in run information uploaded to the network controller in response to predetermined conditions 1152 and then proceeds to await start of another run 1004, 1008 or upload of the run information 1006. The predetermined conditions could, for example, require that the controller 1010 include in the run information only neighbor cells received during the time duration of the run that were received at a signal strength above a predetermined signal strength threshold. This would require the controller to review the run information and delete 1152 any neighbor cells where the measured signal strengths associated therewith is below the signal strength threshold. Another predetermined condition could, for example, require the controller 1010 to include in the run information only a predetermined number of neighbor cells. In this case, the controller 1010 would order the neighbor cells in accordance with the measured signals strengths stored therewith and delete all of the neighbor cells except for a predetermined number of the neighbor cells having the strongest measured signal strengths 1152. After reduction of the neighbor cells in accordance with the predetermined conditions 1152, the controller 1010 deletes all measured signal strengths in the run information in preparation for upload of the run information. Processing then proceeds to determine whether the controller 1010 is tasked to perform any correlation of run information 1150.

When the controller 1010 correlates the run information 1150, it can either correlate information obtained in each run with run information previously obtained 1156, or correlate run information for multiple runs, termed a run-group, to generate run-group information 1158 for providing to the network controller 140 for definition of the user-specific paging zone, or correlate run information to define the user-specific paging zone 1160 and provide the defined paging zone to the network controller 140.

To correlate each run 1156, a simple correlation is performed as each run is completed to calculate a correlation value 1162. One manner of calculating the correlation value C(R1, R2) of the two runs is as follows:

$$C(R1, R2) = 1 - \frac{n_1}{N} - \frac{n_2}{fN} \quad \text{(Equation 2)}$$

where N is the number of cells acquired in the first run, R1; $n_1$ is the number of cells acquired in the second run, R2, that are not acquired cells or neighbor cells of R1; $n_2$ is the number of cells acquired in R2 that are not acquired cells of R1 but are neighbor cells of R1; and $f$ is a predetermined factor used to account for the R2 still correlating well to R1 if, when it strays from R1, it only goes to neighbor cells of R1. In other words, when correlating the two runs, or travel routes, the correlation value is reduced a first predetermined amount (1/N) from a maximum correlation value of one for each acquired cell in the second run that is not an acquired cell or neighbor cell in the first run and further reduced a second predetermined amount (1/fN) for each acquired cell in the second run that is not an acquired cell but is a neighbor cell in the first run.

If the correlation value, C(R1, R2), of the second run, R2, as correlated with the first run, R1, is below a predetermined threshold value 1163, the first and second runs are not similar runs and the second run information is deleted 1164 from the run memory 1017. Processing then returns to determine if it is time to upload the run information 1006.

When the controller 1010 is tasked to correlate a run-group 1158, the controller 1010 first determines whether all of the runs of the run-group have been completed 1166. This could be determined in response to the number of runs completed if a run-group is defined as including a predetermined number of runs or could be determined in response to the clock signal from the clock 1032 if a run-group is defined as including all of the runs performed during a predetermined time frame. If all of the runs of the run-group have not been completed 1166, processing returns to step 1117 to begin another run.

When all of the runs of the run-group are completed 1166, the runs are correlated to define the run-group 1168. One such correlation function is described above in regards to Equation 1 and FIGS. 6 and 7 where the run group is the set of vertices 706 that form a complete sub-graph of diagram 700. Once the run-group is defined 1168, the controller 1010 stores 1169 the run-group definition in the run memory 1017 and returns to step 1106 to determine if it is time to upload the run information.

When the controller 1010 is tasked to define a user-specific paging zone 1160. In accordance with the embodiment of the present invention, a paging zone is defined in accordance with a plurality of run-groups. Accordingly, the plurality of run-groups are first defined 1170 where each run-group can be defined as described in steps 1166 and 1168. Then, the user-specific paging zone is defined 1172 and stored 1173 in the run memory 1017. One method of defining the paging zone in accordance with a plurality of run-groups is selecting a run-group that includes the largest number of runs from a predetermined number of run-groups, where the user-specific paging zone is defined as all of the cells in all of the runs in the selected run-group. Alternatively, a user-specific paging zone can be defined as a first run-group to include more than a predetermined number of runs (i.e., the number of vertices 706 is greater than a predetermined number) or a user-specific paging zone can be defined as a first run-group to include more runs than a predetermined percentage of all runs performed to determine the run-group (i.e., vertices 706 are more than a predetermined percentage of the total of vertices 704 and 706). After the definition of the user-specific paging zone is stored 1173 in the run memory 1017, processing returns to determine if it time to upload 1106 the information stored in the run memory 1017.

When it is time to upload 1106 the information stored in the run memory 1017, the controller 1010 retrieves the information from the run memory 1017 and generates a run message therefrom 1174. The controller 1010 then provides the run message 1176 to the transceiver circuitry 1004 for transmission (or upload) to the network controller 140. Processing then returns to a start of a new run 1117. The time to upload the run information can be determined in response to a predetermined time duration since the last upload (i.e., periodically uploading the run information) or in response to the time of day (e.g., a time of day such as late night when the mobile communication device 120 and the wireless communication system 100 are not expected to be busy) or in response to specific information stored in the run memory 1017 (e.g., when a run-group or a user-specific paging zone is stored, or when a predetermined number of runs or run-groups have been stored, or when the run memory 1017 is full).

Thus, as paging capacity is a major design consideration for most wireless communication networks 100, such as cellular communication systems because pages utilize downlink resources, it is always advantageous to try to minimize the area over which a wireless communication device 120 is paged. The embodiment of the present inventions defines user-specific paging zones to reduce the downlink resources utilized for paging a wireless communication device 120. One of the key steps in defining the user-specific paging zones in accordance with the embodiment of the present invention is determining whether two travel routes, or "runs", through a cellular network are "similar" or "well correlated". Other applications that can benefit from utilizing the correlation methods described above are traffic analysis and management, optimization of system resource allocation, and cell 125 planning and definition.

While technologies such as Global Positioning Satellite (GPS) data can be used to map a mobile communication device's route through a communication system 100, such technologies alone do not identify a repetitive pattern. The embodiment of the present invention as described hereinabove provides various correlation methods to determine whether the mobile communication device 120 follows similar geographical routes during multiple runs and, when such routes are geographically similar, assigns a high correlation factor thereto.

Figure 12:
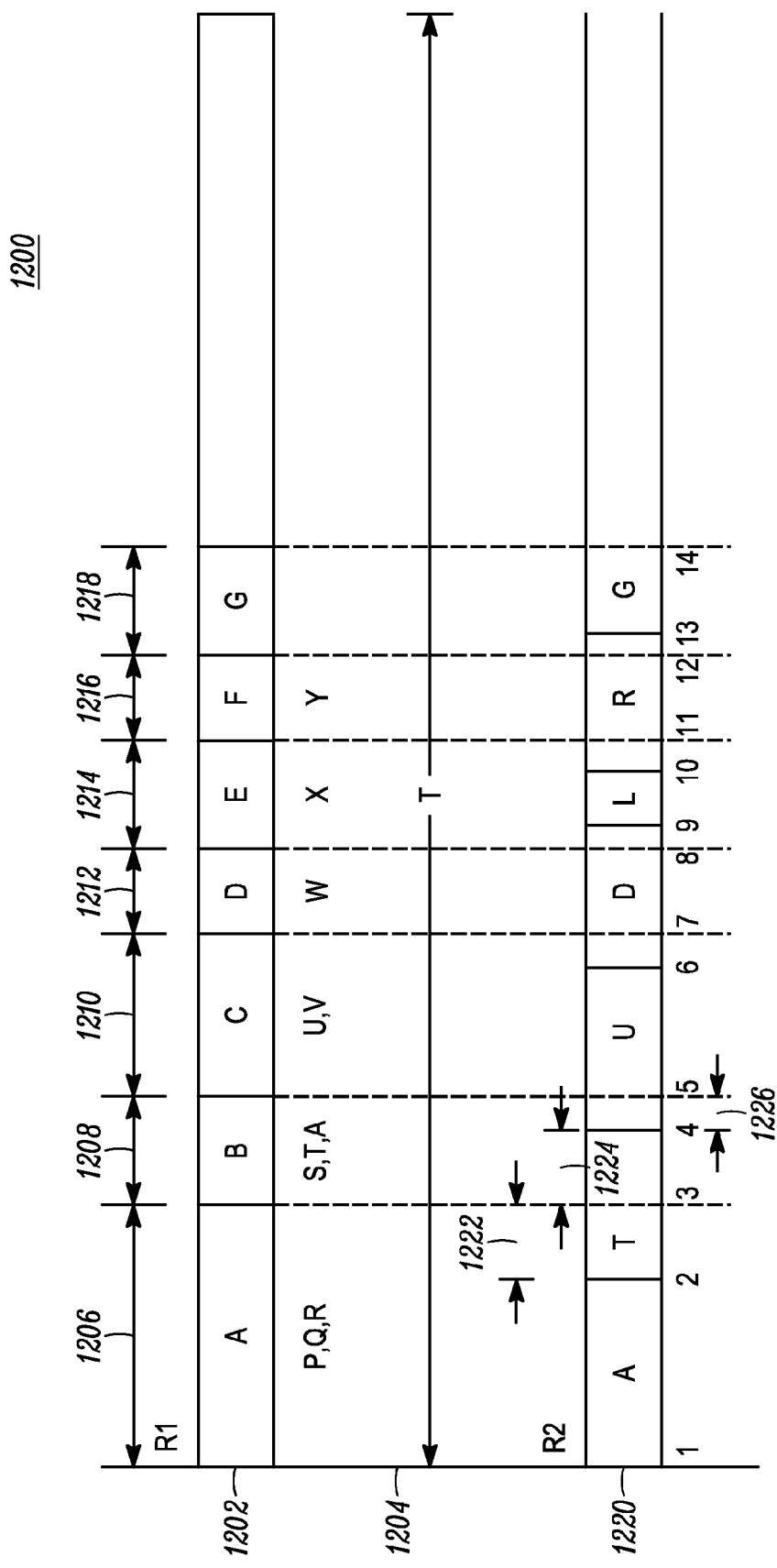
FIG. 12 is a timing diagram of a similar run processing operation for correlation of successive runs to determine if they are similar runs in accordance with the embodiment of the present invention.

Referring to FIG. 12, a timing diagram 1200 of a correlation method based upon correlation value reduction during time slices of a first run (R1) during which cells 1202 (A, B, C, D, E, F, G) are determined to be acquired cells and cells 1204 (P, Q, R, S, T, A, U, V, W, X, Y) are determined to be neighbor cells. A time slice of the run R1 is the duration of the run from the time the mobile communication device 120 moves into a cell 125 to the time it moves into the next cell 125. Thus, the mobile communication device 120 is in cell A during time slice 1206, in cell B during time slice 1208, in cell C during time slice 1210, in cell D during time slice 1212, in cell E during time slice 1214, in cell F during time slice 1216, and in cell G during time slice 1218. The cells 1220 are those cells 125 acquired by the mobile communication device during a second run (R2).

In accordance with the time slice correlation, the second run R2 is split into time periods corresponding to the time slices of the first run R1. Each time slice of the second run R2 is compared to the time slices of the first run R1 and a correlation factor is reduced from a predetermined correlation factor by a value that is proportional to the time spent by the wireless communication device 120 in acquired cells during the second run R2 that are cells not present in the corresponding time slice of the first run R1. Thus, the correlation reduction value for a time period is based on whether the acquired cell during the second run R2 is an acquired cell in the corresponding time slice of the first run R1, or a neighbor cell seen during the corresponding time slice of R1.

Referring to FIG. 12, a predetermined initial correlation factor of 1 is (a) not reduced during the period 1 to 2 because the cells match; (b) reduced by a factor of the proportion of the time duration 1222 to the total time of the first run R1 during the period 2 to 3 because cell T is not an acquired cell or a neighbor cell in time slice 1206 of the first run R1; (c) reduced by a factor of the proportion of the time duration 1224 to the total time of the first run R1 further reduced by a factor ($1/f$) during the period 3 to 4 because cell T is not an acquired cell but is a neighbor cell in time slice 1208 of the first run R1; and (d) reduced by a factor of the proportion of the time duration 1226 to the total time of the first run R1 during the period 4 to 5 because cell U is not an acquired cell or a neighbor cell in time slice 1208 of the first run R1.

Subsequently, the correlation factor is (e) reduced by the proportion of the time duration in period 5 to 6 to the total time duration of the first run R1 further reduced by the factor $1/f$ because cell U is not an acquired cell but is a neighbor cell in time slice 1210 of the first run R1; (f) reduced by the proportion of the time duration in period 6 to 7 to the total time duration of the first run R1 because cell D is not an acquired cell or a neighbor cell in time slice 1210 of the first run R1; (g) not reduced during the period 7 to 8 because the cells match; (h) reduced by the proportion of the time duration in period 8 to 9 to the total time duration of the first run R1 because cell D is not an acquired cell or a neighbor cell in time slice 1214 of the first run R1; and (i) reduced by the proportion of the time duration in period 9 to 10 to the total time duration of the first run R1 because cell L is not an acquired cell or a neighbor cell in time slice 1214 of the first run R1.

In this manner, a correlation factor can be calculated for comparing the similarity of the geographical routes traced by the mobile communication device 120 during the second run R2 as compared to the first run R1.

Operation in accordance with the embodiment of the present invention reliably creates targeted user-specific paging zones. Accurate and reliable means of creating dynamic paging zones increase paging efficiency, leading to shorter delays in call setup and increased to user satisfaction. In addition, operation in accordance with the embodiment of the present invention is a large reduction in paging load in the network and more efficient use of downlink resources. Particularly, by creating paging zones in response to not only acquired cells but also to neighbor cells, operation in accordance with the embodiment of the present invention ensures robustness against variations in RF due to interference or shielding of the mobile communication device 120.

Thus it can be seen that a method and apparatus have been disclosed which advantageously provides optimized targeted paging for a wireless communication device in a multi-cell wireless communication system. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for executing a mobile communication device run as the mobile communication device moves along a first travel route during at least a portion of a first time frame, the method comprising the steps of:

storing first run information in the mobile communication device, wherein the first run information includes a acquired cell data identifying one or more cells acquired by the mobile communication device during the first time frame;

storing second run information in a mobile communication device, wherein the second run information includes acquired cell data identifying one or more cells acquired by the mobile communication device during a second time frame, the mobile communication device moving along a second travel route during at least a portion of the second time frame;

calculating a correlation value for the first travel route and the second travel route in response to the first run information and the second run information;

determining whether the first travel route and the second travel route are similar travel routes in response to the correlation value being greater than a predetermined threshold value;

generating a mobile communication device run message in response to the first run information; and transmitting the mobile communication device run message.

2. The method in accordance with claim 1 wherein the step of generating the mobile communication device run message comprises the steps of:

generating a mobile communication device run message in response to the first run information and the second run information when the first travel route and the second travel route are determined to be similar travel routes; and generating a mobile communication device run message in response to the first run information and not in response to the second run information when the first travel route and the second travel route are determined to not be similar travel routes.

3. A method for executing a mobile communication device run as the mobile communication device moves along a first travel route during at least a portion of a first time frame, the method comprising the steps of:

storing first run information in the mobile communication device, wherein the first run information includes a acquired cell data identifying one or more cells acquired by the mobile communication device during the first time frame;

storing second run information in a mobile communication device, wherein the second run information includes acquired cell data identifying one or more cells acquired by the mobile communication device during a second time frame, the mobile communication device moving along a second travel route during at least a portion of the second time frame;

calculating a correlation value for the first travel route and the second travel route in response to the first run information and the second run information by reducing the correlation value a predetermined amount from a maximum correlation value for each of the one or more cells acquired by the mobile communication device during the second time frame that is not one of the one or more cells acquired by the mobile communication device during the first time frame;

determining whether the first travel route and the second travel route are similar travel routes in response to the correlation value;

generating a mobile communication device run message in response to the first run information; and transmitting the mobile communication device run message.

4. The method in accordance with claim 3 wherein the step of calculating a correlation value for the first travel route and the second travel route further comprises the step of reducing the correlation value the predetermined amount from the maximum correlation value for each of one or more neighbor cells identified during the second time frame that is not one of the one or more cells acquired by the mobile communication device during the first time frame, wherein a neighbor cell is a cell that the mobile communication device is able to receive during the second time frame that is not one of the one or more cells acquired by the mobile communication device during the second time frame.

5. A method for executing a mobile communication device run as the mobile communication device moves along a first travel route during at least a portion of a first time frame, the method comprising the steps of:

storing first run information in the mobile communication device, wherein the first run information includes a acquired cell data identifying one or more cells acquired by the mobile communication device during the first time frame;

storing second run information in a mobile communication device, wherein the second run information includes acquired cell data identifying one or more cells acquired by the mobile communication device during a second time frame, the mobile communication device moving along a second travel route during at least a portion of the second time frame;

calculating a correlation value for the first travel route and the second travel route in response to the first run information and the second run information by reducing the correlation value a first predetermined amount from a maximum correlation value for each of the one or more cells acquired by the mobile communication device during the second time frame that is neither one of the one or more cells acquired by the mobile communication device during the first time frame nor one of one or more neighbor cells identified by the mobile communication device during the first time frame, wherein a neighbor cell is a cell that the mobile communication device is able to receive during the first time frame that is not one of the one or more cells acquired by the mobile communication device during the first time frame;

determining whether the first travel route and the second travel route are similar travel routes in response to the correlation value;

generating a mobile communication device run message in response to the first run information; and transmitting the mobile communication device run message.

6. A method for executing a mobile communication device run as the mobile communication device moves along a first travel route during at least a portion of a first time frame, the method comprising the steps of:

storing first run information in the mobile communication device, wherein the first run information includes a acquired cell data identifying one or more cells acquired by the mobile communication device during the first time frame;

storing second run information in a mobile communication device, wherein the second run information includes acquired cell data identifying one or more cells acquired by the mobile communication device during a second time frame, the mobile communication device moving along a second travel route during at least a portion of the second time frame;

calculating a correlation value for the first travel route and the second travel route in response to the first run information and the second run information by reducing the correlation value a second predetermined amount from a maximum correlation value for each of the one or more cells acquired by the mobile communication device during the second time frame that is not one of the one or more cells acquired by the mobile communication device during the first time frame but is one of one or more neighbor cells identified by the mobile communication device during the first time frame, wherein a neighbor cell is a cell that the mobile communication device is able to receive during the first time frame that is not one of the one or more cells acquired by the mobile communication device during the first time frame and wherein the second predetermined amount is less than the first predetermined amount;

determining whether the first travel route and the second travel route are similar travel routes in response to the correlation value;

generating a mobile communication device run message in response to the first run information; and transmitting the mobile communication device run message.

7. A method for optimizing paging of a mobile communication device in cells of a multi-cell communication system, the method comprising the steps of:

defining a user specific paging zone for the mobile communication device, the user specific paging zone comprising a portion of the cells selected in response to cells acquired during one or more mobile communication device runs and neighbor cells adjacent to those acquired during the one or more mobile communication device runs that are detected by the mobile communication device during the one or more mobile communication device runs and meet predetermined conditions, wherein the predetermined conditions are selected from a group of predetermined conditions including a first condition that the mobile communication device receives a radio frequency (RF) signal from the neighbor cells at a power value above a predetermined minimum power value and a second condition that a power of an RF signal received from the neighbor cells is one of a predetermined number of strongest signals received by the mobile communication device from neighbor cells; and paging the mobile communication device within the portion of the cells.

8. The method in accordance with claim 7 wherein the step of defining the user specific paging zone comprises the step of identifying cells acquired during the one or more mobile communication device runs by storing an identification of each cell the mobile communication device acquires during each of the one or more mobile communication device runs.

9. The method in accordance with claim 7 wherein the step of defining the user specific paging zone further comprises the step of defining the user specific paging zone for the mobile communication device in response to an amount of time spent by the mobile communication device in the cells acquired during one or more mobile communication device runs.

10. A method for optimizing paging of a mobile communication device in cells of a multi-cell communication system, the method comprising the steps of:

defining a user specific paging zone for the mobile communication device, the user specific paging zone comprising a portion of the cells selected in response to cells acquired during one or more mobile communication device runs and neighbor cells adjacent to those acquired during a plurality of similar mobile communication device runs, wherein the step of selecting the portion of the cells comprises the steps of:

correlating cells acquired and neighbor cells adjacent to those acquired during a second one of the one or more mobile communication device runs with cells acquired and neighbor cells adjacent to those acquired during a first one of the one or more mobile communication device runs to determine a correlation factor therebetween; and selecting the portion of the cells in response to the correlation factor indicating that the first one and the second one of the one or more mobile communication device runs are highly correlated with one another; and paging the mobile communication device within the portion of the cells.

11. The method in accordance with claim 10 wherein the step of correlating the cells acquired and the neighbor cells adjacent to those acquired comprises the step of determining closeness of a present geographical route corresponding to the second one of the one or more mobile communication device runs to one or more previous geographical routes corresponding to other ones of the one or more mobile communication device runs by comparing ones of the cells acquired and neighboring cells of the cells acquired during traversal of the present geographical route with ones of the cells acquired and neighboring cells of the cells acquired during traversal of the one or more previous geographical routes.

12. The method in accordance with claim 11 wherein the cells acquired and the neighbor cells adjacent to those acquired during the another one of the one or more mobile communication device runs are highly correlated with the cells identified by stored cell identification data of the one or more previous geographical routes if a proportion of the cells acquired and neighbor cells adjacent to the cells acquired during traversal of the present geographical route that are not cells in the cells identified by the stored cell identification data of the one or more previous geographical routes is below a predetermined value.

13. The method in accordance with claim 12 wherein the step of correlating cells acquired and neighbor cells adjacent to those acquired comprises the step of determining whether the cells acquired and the neighbor cells detected during the another one of the one or more mobile communication device runs are highly correlated with cells identified by the stored cell identification data in response to whether they correlate therewith by a correlation factor greater than a predetermined correlation factor.

14. The method in accordance with claim 12 wherein the step of correlating cells acquired and neighbor cells comprises the step of determining whether the cells acquired and the neighbor cells adjacent to those acquired during the another one of the one or more mobile communication device runs are highly correlated with the cells identified by the stored cell identification data in response to the cell identification data and time data indicating time spent within the cells acquired.

15. A method for determining whether two geographical routes traversed by a mobile communication device are geographically similar, the method comprising the steps of:

generating a first geographical route run by identifying at least one or more cells acquired by the mobile communication device as it traverses the first geographical route;

generating a second geographical route run by identifying at least one or more cells acquired by the mobile communication device as it traverses the second geographical route;

calculating a correlation value by calculating a correlation value for a plurality of time slices of the first and second geographical runs, the correlation value for each one of the plurality of time slices being calculated in response to an amount of time in the one of the plurality of time slices that the mobile communication device in the second geographical run is in one of the plurality of cells that is not an acquired cell acquired during the one of the plurality of time slices during the first geographical run; and determining that the second geographical route run is geographically similar to the first geographical route run in response to the correlation value being greater than a predetermined threshold value.

16. The method in accordance with claim 15 wherein the step of generating a first geographical route run comprises the step of generating a first geographical route run by identifying one or more cells that are either acquired by the mobile communication device as it traverses the first geographical route or neighbor cells of cells acquired by the mobile communication device as it traverses the first geographical route that meet predetermined conditions, and wherein the step of generating a second geographical route run comprises the step of generating a second geographical route run by identifying one or more cells that are either acquired by the mobile communication device as it traverses the second geographical route or neighbor cells of cells acquired by the mobile communication device as it traverses the second geographical route that meet predetermined conditions.

17. The method in accordance with claim 16 wherein the predetermined conditions include radio frequency (RF) signals received by neighbor cells that have a signal strength greater than a predetermined threshold signal strength.

18. The method in accordance with claim 16 wherein the predetermined conditions include a predetermined number of neighbor cells that have a signal strength greater than other neighbor cells.

19. The method in accordance with claim 15 wherein the step of calculating the correlation value comprises the step of successively reducing the correlation value from a maximum correlation value each time a cell is identified on the second geographical route run that is not a cell acquired by the mobile communication device during the first geographical route run.

20. The method in accordance with claim 15 wherein the step of calculating the correlation value for each one of the plurality of time slices of the first and second geographical runs comprises the step of calculating the correlation value for each one of the plurality of time slices in response to an amount of time in the one of the plurality of time slices that the mobile communication device in the second geographical run is in one of the plurality of cells that is neither an acquired cell nor a neighbor cell adjacent to an acquired cell acquired during the one of the plurality of time slices during the first geographical run.

21. A mobile communication device comprising:
a radio frequency antenna for receiving and transmitting RF signals;
transceiver circuitry coupled to the antenna for receiving, demodulating and decoding radio frequency (RF) signals to recover information therefrom, the transceiver also encoding information, modulating the encoded information into signals and providing the signals to the antenna for transmission therefrom as RF signals;
a clock for generating a time signal;
a storage element for storing first run information; and
a controller coupled to the transceiver circuitry for receiving recovered information therefrom, the controller generating acquired cell data from the recovered information, the acquired cell data identifying one or more cells acquired by the mobile communication device during a first time frame, wherein the controller is also coupled to the clock for receiving the time signal therefrom and generating cell time information identifying a time duration spent communicating with each acquired cell in response to the time signal, the controller further coupled to the storage element for storing the first run information therein, the first run information including the acquired cell data and the cell time information, and wherein the controller generates a mobile communication device run message in response to the first run information and provides the mobile communication device run message to the transceiver circuitry for transmission from the mobile communication device.

22. The mobile communication device in accordance with claim 21 wherein the mobile communication device moves along a first travel route during at least a portion of the first time frame.

23. The mobile communication device in accordance with claim 22 wherein the mobile communication device moves along a second travel route during at least a portion of a second time frame, and wherein the controller generates second run information and stores the second run information in the storage element, the second run information including acquired cell data identifying one or more cells acquired by the mobile communication device during the second time frame, the controller further determining whether the first travel route and the second travel route are similar travel routes in response to the first run information and the second run information.

24. The mobile communication device in accordance with claim 23 wherein the controller generates a mobile communication device run message in response to the first run information and the second run information when the first travel route and the second travel route are determined to be similar travel routes and generates a mobile communication device run message in response to the first run information and not in response to the second run information when the first travel route and the second travel route are determined to not be similar travel routes.

25. The mobile communication device in accordance with claim 23 wherein the controller determines whether the first travel route and the second travel route are similar travel routes in response to a correlation value calculated by correlating the first travel route and the second travel route.

26. The mobile communication device in accordance with claim 25 wherein the controller determines that the first travel route and the second travel route are similar travel routes in response to the correlation value being greater than a predetermined threshold value.

27. The mobile communication device in accordance with claim 25 wherein the controller calculates the correlation value by reducing the correlation value a predetermined amount from a maximum correlation value for each of the one or more cells acquired during the second time frame that is not one of the one or more cells acquired during the first time frame.

28. The mobile communication device in accordance with claim 27 wherein the controller calculates the correlation value by further reducing the correlation value the predetermined amount from the maximum correlation value for each of one or more neighbor cells identified during the second time frame that is not one of the one or more cells acquired during the first time frame, wherein a neighbor cell is a cell for which the controller is able to detect a signal during the second time frame that is not one of the one or more cells acquired during the second time frame.

29. The mobile communication device in accordance with claim 25 wherein the controller calculates the correlation value by reducing the correlation value a predetermined amount from a maximum correlation value for each of the one or more cells acquired during the second time frame that is neither one of the one or more cells acquired by during the first time frame nor one of one or more neighbor cells detected during the first time frame, wherein a neighbor cell is a cell for which the controller is able to detect a signal during the second time frame that is not one of the one or more cells acquired during the second time frame.

30. A multi-cell communication system comprising:
a plurality of cells, each of the plurality of cells having one of a plurality of base stations located therein for transmitting and receiving radio frequency (RF) signals; and
a network controller coupled to each of the plurality of base stations for providing information thereto for transmission as RF signals within an associated one of the plurality of cells and for receiving information therefrom received from RF signals transmitted in the associated one of the plurality of cells, wherein the network controller defines a user specific paging zone for a mobile communication device, the user specific paging zone comprising a portion of the plurality of cells selected in response to information received from the mobile communication device identifying ones of the plurality of cells acquired by the mobile communication device during one or more mobile communication device runs and ones of the plurality of cells that are neighbor cells detected during the one or more mobile communication device runs, the network controller defining the user specific paging zone by selecting the ones of the plurality of cells in response to cells acquired and neighbor cells adjacent to those acquired during a plurality of similar mobile communication device runs, wherein the network controller determines whether mobile communication device runs are similar mobile communication device runs by grouping together ones of the one or more mobile communication device runs that are highly correlated with one another.

31. The multi-cell communication system in accordance with claim 30 wherein the network controller selects the ones of the plurality of cells by correlating cells acquired and neighbor cells adjacent to those acquired during a second one of the one or more mobile communication device runs with cells acquired and neighbor cells adjacent to those acquired during a first one of the one or more mobile communication device runs to determine a correlation factor therebetween and selects the ones of the plurality of cells in response to the correlation factor indicating that the first one and the second one of the one or more mobile communication device runs are highly correlated with one another.

32. The multi-cell communication system in accordance with claim 31 wherein the network controller correlates the cells acquired and the neighbor cells adjacent to those acquired by determining the closeness of a present geographical route corresponding to the second one of the one or more mobile communication device runs with one or more previous geographical routes corresponding to other ones of the one or more mobile communication device runs, the closeness determined by comparing ones of the cells acquired and neighboring cells of the cells acquired during traversal of the present geographical route with ones of the cells acquired and neighboring cells of the cells acquired during traversal of the one or more previous geographical routes.

33. The multi-cell communication system in accordance with claim 32 wherein the network controller determines that the cells acquired and the neighbor cells adjacent to those acquired during the another one of the one or more mobile communication device runs are highly correlated with the ones of the plurality of cells identified by cell identification data of the one or more previous geographical routes if the number of the cells acquired and neighbor cells adjacent to the cells acquired during traversal of the present geographical route that are not ones of the plurality of cells identified by the stored cell identification data of the one or more previous geographical routes is below a predetermined number of cells.

34. The multi-cell communication system in accordance with claim 31 wherein the network controller determines whether the cells acquired and the neighbor cells adjacent to those acquired during the another one of the one or more mobile communication device runs are highly correlated with the cells identified by the stored cell identification data in response to whether they correlate therewith by a correlation factor greater than a predetermined correlation factor.

35. The multi-cell communication system in accordance with claim 31 wherein the network controller determines whether the cells acquired and the neighbor cells adjacent to those acquired during the another one of the one or more mobile communication device runs are highly correlated with the cells identified by the stored cell identification data in response to the cell identification data and time data indicating time spent within the cells acquired.

* * * * *